US011522624B2

United States Patent
Thein et al.

(10) Patent No.: US 11,522,624 B2
(45) Date of Patent: Dec. 6, 2022

(54) METHOD FOR THE LOCATIONALLY SELECTIVE TRANSMISSION OF A SIGNAL BY RADIO, METHOD FOR THE LOCATIONALLY SELECTIVE RECEPTION OF A SIGNAL BY RADIO, AND TRANSMITTER/RECEIVER UNIT FOR CARRYING OUT SUCH A METHOD

(71) Applicant: Robert Bosch GmbH, Stuttgart (DE)

(72) Inventors: Christoph Thein, Hildesheim (DE); Klaus Sambale, Oberhausen (DE); Frank Hofmann, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 62 days.

(21) Appl. No.: 17/306,206

(22) Filed: May 3, 2021

(65) Prior Publication Data

US 2021/0258093 A1    Aug. 19, 2021

Related U.S. Application Data

(63) Continuation of application No. 16/641,891, filed as application No. PCT/EP2018/071575 on Aug. 9, 2018, now Pat. No. 11,044,029.

(30) Foreign Application Priority Data

Aug. 29, 2017   (DE) .......................... 102017215073.4

(51) Int. Cl.
*H04W 24/00*        (2009.01)
*G06F 3/033*        (2013.01)
(Continued)

(52) U.S. Cl.
CPC ............ *H04H 60/42* (2013.01); *H04H 20/53* (2013.01); *H04H 40/09* (2013.01); *H04H 60/15* (2013.01); *H04W 4/029* (2018.02)

(58) Field of Classification Search
CPC ........ H04H 60/42; H04H 20/53; H04H 40/09; H04H 60/15; H04W 4/029
(Continued)

(56) References Cited

U.S. PATENT DOCUMENTS

| 2001/0046289 A1 | 11/2001 | Robinson et al. |
| 2002/0078228 A1 | 6/2002 | Kuisma et al. |

(Continued)

FOREIGN PATENT DOCUMENTS

WO    2008147085 A2    12/2008

OTHER PUBLICATIONS

International Search Report for PCT/EP2018/071575, dated Nov. 15, 2018.

*Primary Examiner* — Mark G. Pannell
(74) *Attorney, Agent, or Firm* — Norton Rose Fulbright US LLP; Gerard Messina

(57) ABSTRACT

A method is described for the locationally selective transmission of a signal by radio. Both a transmitter and a receiver are synchronized to the same time reference. The receiver receiving and demodulating, at a time that is one of the specified times of the time reference, a signal transmitted by the transmitter, if the receiver has received the signal at a time that is one of the specified times. The method includes the transmitter determining a receive location within a receive zone to which it wishes to transmit the signal in selective fashion, a position in the receive zone being a function of a position of the transmitter and a signal runtime. The method also includes the transmitter transmitting the signal; and the receiver, which is situated inside the receive zone, receives and demodulates the signal.

18 Claims, 4 Drawing Sheets

(51) Int. Cl.
  *H04B 7/00* (2006.01)
  *H04H 60/42* (2008.01)
  *H04W 4/029* (2018.01)
  *H04H 20/53* (2008.01)
  *H04H 40/09* (2008.01)
  *H04H 60/15* (2008.01)

(58) Field of Classification Search
  USPC ..................................................... 455/456.1
  See application file for complete search history.

(56) References Cited

U.S. PATENT DOCUMENTS

| | | |
|---|---|---|
| 2002/0136231 A1 | 9/2002 | Leatherbury et al. |
| 2003/0153288 A1 | 8/2003 | Nakatsuyama |
| 2005/0058151 A1 | 3/2005 | Yeh |
| 2005/0096065 A1 | 5/2005 | Fleischman |
| 2007/0153140 A1 | 7/2007 | Kubota et al. |
| 2009/0175223 A1 | 7/2009 | Hall |
| 2010/0146562 A1 | 6/2010 | Asahara et al. |
| 2010/0296436 A1 | 11/2010 | Kwon et al. |
| 2013/0065610 A1 | 3/2013 | Attar et al. |
| 2015/0305062 A1 | 10/2015 | Sung et al. |
| 2017/0150314 A1 | 5/2017 | Hwang et al. |
| 2017/0237591 A1 | 8/2017 | Atungsiri et al. |
| 2017/0339733 A1 | 11/2017 | Kurian et al. |

METHOD FOR THE LOCATIONALLY SELECTIVE TRANSMISSION OF A SIGNAL BY RADIO, METHOD FOR THE LOCATIONALLY SELECTIVE RECEPTION OF A SIGNAL BY RADIO, AND TRANSMITTER/RECEIVER UNIT FOR CARRYING OUT SUCH A METHOD

CROSS REFERENCE

The present application is a continuation application of U.S. patent application Ser. No. 16/641,891, filed Feb. 25, 2020, which is a U.S. National Phase of International Application PCT/EP2018/071575, filed Aug. 9, 2018, and claims the benefit under 35 U.S.C. § 119 of German Patent Application No. DE 10 2017 215 073.4, filed on Aug. 29, 2017, all of which are hereby incorporated by reference in their entireties.

FIELD

The present invention relates to a method for the locationally selective transmission of a signal by radio, a method for the locationally selective reception of a signal by radio, a transceiver unit for carrying out such a method, a computer program, a machine-readable storage medium, and an electronic control device.

BACKGROUND INFORMATION

In the existing art, mobile radiotelephone-based geocasting services are conventional. Here, at the application level, on the basis of a position of the subscriber it is decided whether a message is relevant for the corresponding subscriber. If the message of the geocasting service is intended for subscribers of a specified region in which the corresponding subscriber is located, then this message is made known to the corresponding subscriber. However, if the corresponding subscriber is not in the specified region, then the message is not made known to the subscriber. In both cases, however, the message is transmitted to the subscriber.

SUMMARY

The example methods according to the present invention may be used either for the locationally selective transmission or reception of the signal via radio technology. In radio technology, signals of all types are wirelessly transmitted via radio waves, using modulated electromagnetic waves. Radio technology includes, inter alia, mobile radiotelephony and broadcast radio.

Preferably, a receiver is understood as a nonstationary receiver, for example a mobile radiotelephone device or a mobile radiotelephone receiver installed in a motor vehicle. However, the receiver can also be stationary.

The transmitter is understood as, preferably, a stationary mobile radiotelephone transmitter. However, the transmitter can also be nonstationary.

The method for locationally selective transmission can be used for example in a geocasting system. Here, the transmitter selectively sends certain items of information only to the receivers that are situated in a specified locational area. Here, the specified locational area may be a region or a district. Preferably, the region or the district is contiguous. Another example of use is the locationally selective addressing of sensors, which may be stationary or nonstationary sensors. The particular items of information that the transmitter selectively transmits to the above-named receivers may in particular be items of information that are particularly relevant for the receivers situated in the specified locational area. These may be, for example, items of weather information or traffic information concerning the specified locational area.

The method for locationally selective reception may also be used in a geocasting system, for example, if the receiver knows the location of a stationary transmitter and wishes to receive items of information selectively from this stationary transmitter. According to another example, the receiver can receive selectively from a radio transmitter if the receiver knows from what direction the radio transmitter is transmitting or if the receiver knows the position of the radio transmitter.

Both in the example method for transmission and in the example method for reception, both a transmitter and a receiver are synchronized to the same time reference. This can take place for example through a multiplicity of periodically repeating times. However, these specified times need not necessarily repeat periodically. It is sufficient for the specified times to be known to the transmitter and to the receiver.

In the example method for transmission, the receiver receives, at one of the specified times, a signal sent by the transmitter and demodulates it if the receiver has received the signal at one of the specified times.

Here there is a time window within which the receiver can receive the signal. This time window is a function in particular of the structure of the transmitted signal. An example of this is the cyclic prefix extension of an OFDM symbol, which makes the OFDM symbol capable of being demodulated at the receiver even when there are temporal shifts, within certain limits.

In the first step of the example method for locationally selective transmission, the transmitter determines a receive location within a receive zone to which the transmitter wishes to selectively send the signal. Here, a position in the receive zone is a function of a position of the transmitter and a signal runtime. Because there is a time window within which the receiver can receive the signal, the receive zone generally has a circular annular shape. If the transmitter sends the signal in a particular preferred direction, then the receive zone has the shape of a segment of a circular ring. The width of the receive zone, i.e., a radial extension of the receive zone, is a function of the structure of the transmitted signal.

In a second step of the example method, the transmitter transmits the signal. Here, the transmitter transmits the signal at a time that is before the receive time previously known to the transmitter and to the receiver. The previously known receive time is one of the specified times of the time reference. The time difference between the transmit time and the receive time corresponds to the signal runtime from the transmitter to the receiver, so that the transmitted signal arrives at the receiver at the previously known receive time. The transmission can be isotropic, i.e., direction-independent, or direction-dependent. The direction-dependent transmission of the signal can take place using beamforming or directed antennas.

In a third step of the example method, the receiver situated in the receive zone receives and demodulates the signal.

The example method for the locationally selective transmission of the signal by radio can advantageously bring it about that a transmitter can selectively transmit a signal to a receiver situated within the receive zone.

In the example method for the locationally selective reception of a signal by radio, the transmitter transmits a signal at one of the prespecified times of the time reference.

Preferably, in the example method for the locationally selective reception of the signal by radio, a plurality of locationally separate transmitters are used that transmit a plurality of independent signals independently of one another.

In the first step of the example method for the locationally selective reception of a signal, the receiver determines a transmit location within a transmit zone from which the receiver wishes to selectively receive the signal. Here, a position in the transmit zone is a function of a position of the receiver and a signal runtime.

Generally, the receiver does not precisely know the position of the transmitter inside the transmit zone. For this reason, as a rule the transmit zone has a circular ring shape. If the receiver receives the signal from a particular preferred direction, the transmit zone has the shape of a circular ring segment. The width of the transmit zone, i.e. a radial extension of the receive zone, is substantially a function of the signal structure.

Preferably, the receiver determines the distance from which the receiver wishes to receive a signal.

In a second step of the example method for the locationally selective reception of the signal, during a receive time period the receiver receives a signal sent by the transmitter and demodulates the signal. A receive time period results due to the fact that the transmitter transmits at a previously known transmit time from a location within the transmit zone that is not precisely known. Depending on where the transmitter is located within the transmit zone, runtimes of different lengths thus result. This results in a time period during which the signal is received by the receiver.

Here, the reception can be isotropic, i.e., independent of direction, or can be directionally dependent. The direction-dependent reception of the signal can take place through beamforming or using directed antennas.

Through the example method for the locationally selective reception of a signal by radio, it can advantageously be achieved that a receiver can selectively receive a signal from a transmitter situated inside the transmit zone.

According to a preferred specific embodiment of the method for locationally selective transmission, the receive location within the receive zone can be defined with a precision between 300 m and 2 m. It is further preferred that the precision be between 300 m and 1 cm. This has the advantage that a position of a desired receiver is known to within the named degree of precision.

According to a preferred specific embodiment, the signal is sent by the transmitter in such a way that only one receiver, which is situated within the receive zone, can receive the signal. According to a further preferred specific embodiment, the signal is sent by the transmitter in such a way, in particular through a choice of the time, that without further synchronization only one receiver, situated within the receive zone, can receive the signal. According to a further preferred specific embodiment, the reason that without further synchronization only one receiver, situated within the receive zone, can receive the signal is based in the fact that the signal sent by the transmitter is modulated in such a way that only one receiver, situated within the receive zone, can correctly demodulate the transmitted signal. Here, the term "correctly demodulate" is understood to mean that the demodulated signal can be further processed in the context of the respective application. This has the advantage that receivers that are not intended to receive the signal will know already after the demodulation of the signal whether the signal is intended for the receiver.

The circumstance that only one receiver, situated within the receive zone, can receive the signal without further synchronization of the signal can preferably be brought about by a suitable choice of a corresponding transmission method, such as a spreading method or a multi-carrier transmission having a cyclic prefix as modulation type. Here, a too-short or too-long signal runtime will result in an incorrect demodulation that will be rejected by error protection mechanisms already in the physical transmission layer.

According to a further preferred specific embodiment, in the context of a spreading method the transmitter uses a CAZAC function or a CAZAC sequence for the modulation of the mobile radiotelephone signal, and the receiver uses a corresponding demodulation.

A CAZAC function or a CAZAC sequence is a complex-valued mathematical sequence or function that has a constant amplitude and whose autocorrelation yields the result zero (constant amplitude zero autocorrelation).

For a propagation of an electromagnetic signal, this has the advantage that even when there is multipath propagation no interference occurs, because the ZC sequences arriving at the receiver with a delay are oriented orthogonally to one another.

Preferably, for spreading methods the CAZAC sequence is a Zadoff-Chu sequence (ZC sequence). For the complex value at each position n of each Zadoff-Chu sequence with the parameter u, the following holds:

$$x_u(n) = e^{-j\frac{\pi \cdot u \cdot n(n+1+2 \cdot q)}{N_{ZC}}}$$

with $$0 \le n < N_{ZC},$$

$$0 < u < N_{ZC} \text{ and } gcf(N_{ZC}, u) = 1,$$

$$q \in \mathbb{Z}$$

where $N_{ZC}$ stands for the length of the Zadoff-Chu sequence. The abbreviation gcf stands for the greatest common factor of the two whole-number values indicated in the parentheses.

A CAZAC sequence can be used both in the method for selective transmission and also in the method for receiving the signal.

The use of a CAZAC sequence has the advantage that it can be easily generated, and, due to the property of the disappearing autocorrelation, the demodulation during a time shift that corresponds to a reception outside the receive zone does not make a contribution. In this way, at the receiver it is clear that the message is not intended for the receiver, and possible interference with other signals is avoided.

Preferably, the transmission and/or reception takes place on the level of the physical layer. The physical layer is layer 1 in the OSI reference model. It defines the electronic, functional, and procedural parameters and auxiliaries for the physical connection between units in a network. The most important function of the physical layer is the maintenance of a physical connection. Here, in particular the structure of the bits, the meaning of the bits, and the methods for the transmission of individual bits are defined. The standards relevant for PC-LANs also include the transmission medium, the data connectors, gain levels, etc. The OSI (Open Systems Interconnection) model is a reference model for network protocols as layer architecture. It is published as a standard by the International Telecommunication Union (ITU) and the International Organization for Standardization (ISO). Compared to specific embodiments in which a decision as to where the signal is sent, or from where the signal is received, is not made until the application level, the present feature has the advantage that the signal can be processed substantially more quickly, because the expense for the handling of each incoming signal by the complete communication protocol stack is not incurred.

According to a preferred specific embodiment, the transmitter transmits the signal in a specified direction, or the receiver receives the signal from a specified direction. This initial form can be realized by beamforming or by directed antennas. This initial form has the advantage that the selectivity of the transmission or reception is further increased.

Preferably, the transmitter and the receiver are synchronized to the same time reference by the Global Positioning System. The Global Positioning System has the advantage that it is available almost everywhere and is a widely used standard.

According to a preferred specific embodiment, a width of the annular receive zone can be modified, in particular enlarged, by the transmitter via the choice of the signal structure. For example, the width of the receive zone can be modified by choosing a length of a cyclic prefix. Through the use of a longer cyclic prefix, the symbol can be correctly demodulated with a larger absolute time shift. This relates in particular to OFDM-based systems. Through this feature, it is advantageously brought about that the signal can be transmitted to a plurality of receivers in locationally selective fashion.

According to a further specific embodiment, a width of the annular receive zone can be enlarged by an additional synchronization at the receiver. In this way, supplementing the common time reference, the receive area is enlarged at the receiver independently of the transmitter. This has the advantage that the signal can be transmitted to a plurality of receivers. In addition, this has the advantage that the signal can be received by a plurality of receivers.

Preferably, the locationally selective transmission and/or reception is used in a geocasting system. This has the advantage that the messages sent by the geocasting system, for example regional information about traffic, roadways, etc., can be sent only to the desired receivers and/or can be received only from the desired transmitters.

The transmit unit is set up to transmit a signal in locationally selective fashion using the method for locationally selective transmission. The receive unit is set up to receive a signal in locationally selective fashion using the method for locationally selective reception. One of the above-described methods can advantageously be carried out by the transceiver unit. Such a transceiver unit has the same advantages as the method described above.

The computer program is set up to carry out each step of the method, in particular when it is executed on an electronic control device or computing device. This enables the implementation of the method in a conventional control device without having to make constructive modifications. For this purpose, the computer program is stored on a machine-readable storage medium. Through the execution of the computer program on a conventional electronic control device, the electronic control device is obtained that is set up to transmit or to receive a signal in locationally selective fashion.

BRIEF DESCRIPTION OF THE DRAWINGS

Exemplary embodiments of the present invention are shown in the figures and are explained in more detail below.

DETAILED DESCRIPTION OF EXAMPLE EMBODIMENTS

Figure 1:
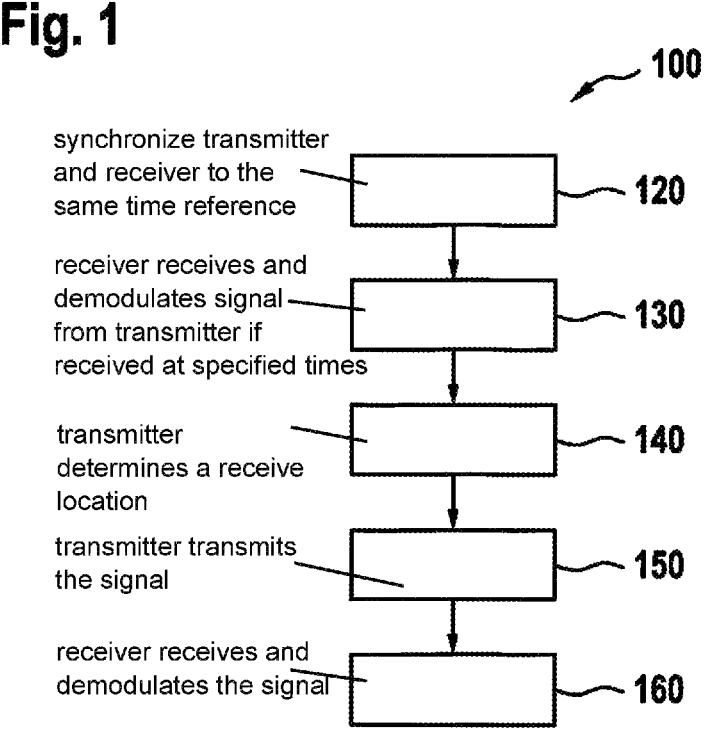
FIG. 1 shows a flow diagram of a method for the locationally selective transmission of the signal by radio according to a specific embodiment.

FIG. 1 shows a method 100 for the locationally selective transmission of a signal by radio.

In the first step 120 of method 100, both a transmitter and a receiver are synchronized to the same time reference by the Global Positioning System.

In a second step 130 of method 100, at the specified times of the time reference the receiver receives and demodulates a signal sent by the transmitter, if the transmitter has received the signal at one of the specified times.

In a third step 140 of method 100, the transmitter determines a receive location within a receive zone to which it wishes to selectively transmit the signal. Here, a position in the receive zone is a function of a position of the transmitter and a signal runtime.

Here, a width of the annular receive zone is enlarged by the transmitter through the selection of a length of a cyclic prefix. In addition, the width of the annular receive zone is enlarged by an additional synchronization at the receiver.

In a fourth step 150 of method 100, the transmitter transmits the signal. Here, the signal is transmitted by the transmitter in such a way that only one receiver, situated within the receive zone, can correctly demodulate the signal. This can be brought about, inter alia, by OFDM or a corresponding spreading method. For example, here the transmitter uses a CAZAC sequence for the modulation of the mobile radiotelephone signal, and the receiver uses a corresponding demodulation.

The locationally selective transmission of the initial form of FIG. 1 is used in a geocasting system.

In a fifth step 160 of method 100, the receiver situated within the receive zone receives and demodulates the signal. Here, the receiver can enlarge the receive zone, independently of the transmitter, through an additional synchronization.

In the specific embodiment of FIG. 1, the transmission and reception take place on the level of the physical layer.

Figure 2:
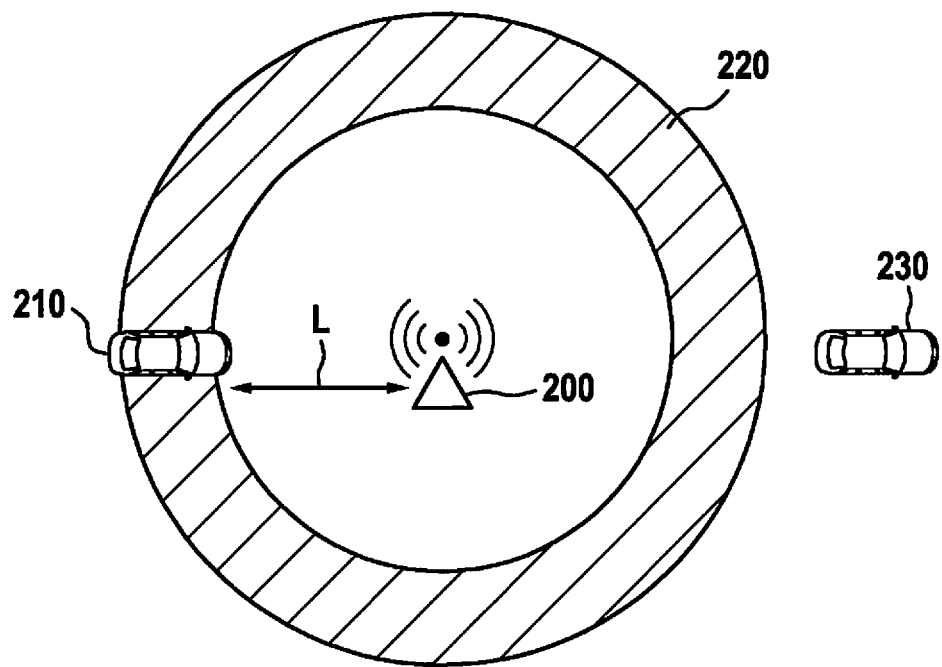
FIG. 2 illustrates a spatial relationship between the transmitter and receiver of a method for locationally selective transmission according to a specific embodiment.

FIG. 2 illustrates a spatial relationship between the transmitter and receiver of a method for locationally selective transmission.

FIG. 2 shows a stationary transmitter 200 that wishes to send a signal to a desired receiver 210 situated in receive zone 220. Desired receiver 210 is here situated in a motor vehicle. The distance between transmitter 200 and desired receiver 210 is L. The distance L corresponds to a particular runtime between transmitter 200 and desired receiver 210.

The signal is transmitted by transmitter 200 in such a way that only the desired receiver 210, situated within receive zone 220, can correctly demodulate the signal. An undesired receiver 230, not situated in receive zone 220, cannot correctly demodulate the signal. Undesired receiver 230 is here also situated in a motor vehicle.

Figure 3:
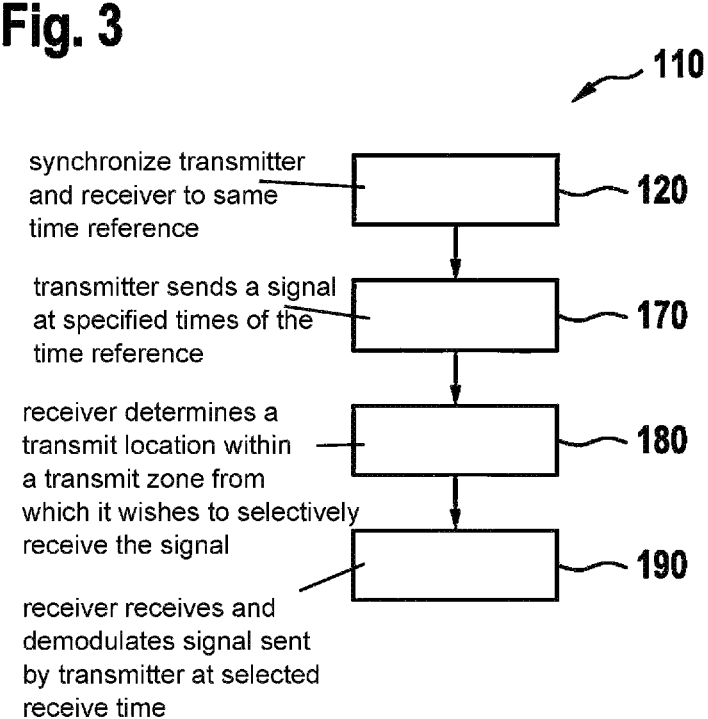
FIG. 3 shows a flow diagram of a method for locationally selective reception of a signal by radio according to a specific embodiment.

FIG. 3 shows a method 110 for the locationally selective reception of a signal by radio.

In a first step 120 of method 110, both a transmitter and a receiver are synchronized to the same time reference by the Global Positioning System.

In a third step 170 of method 110, the transmitter sends a signal at specified times of the time reference. Here, the transmitter uses a CAZAC sequence for the modulation of the radio signal, and the receiver uses a corresponding demodulation.

In a fourth step 180 of method 110, the receiver determines a transmit location within a transmit zone from which it wishes to selectively receive the signal. Here, a position in the transmit zone is a function of a position of the receiver and a signal runtime.

In a fifth step 190 of method 110, the receiver receives a signal sent by the transmitter at the selected receive time, resulting from the transmit time and the signal runtime, whereupon the receiver demodulates the signal when there is a successful detection.

In the specific embodiment of FIG. 3, the transmission and reception take place on the level of the physical layer.

The locationally selective reception of the specific embodiment of FIG. 3 is used in a geocasting system.

Figure 4:
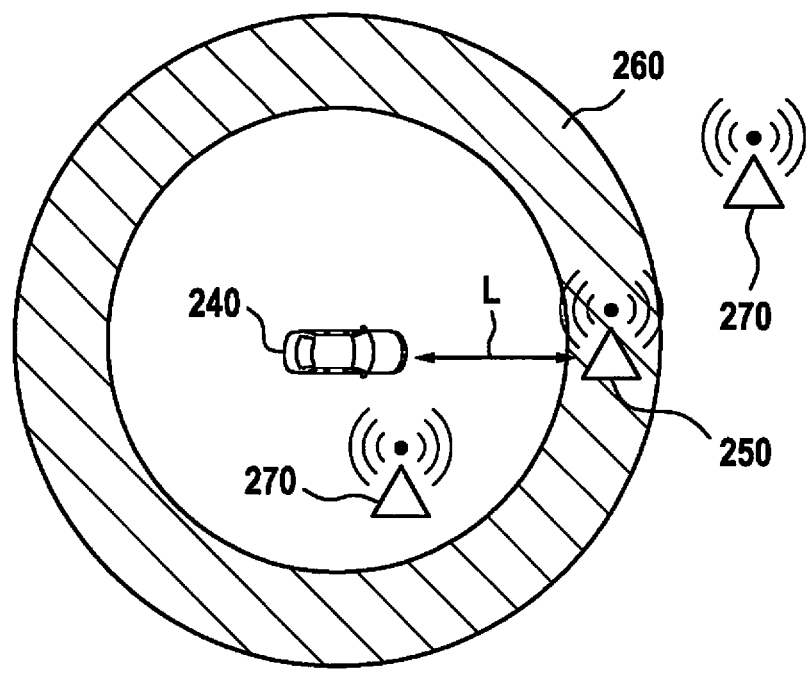
FIG. 4 illustrates a spatial relationship between the transmitter and receiver of a method for locationally selective reception according to a specific embodiment.

FIG. 4 illustrates a spatial relationship between the transmitter and receiver of a method for locationally selective reception.

FIG. 4 shows a nonstationary receiver 240 situated in a motor vehicle. Nonstationary receiver 240 intends to receive a signal from a desired transmitter 250 situated in transmit zone 260. The distance between desired transmitter 250 and receiver 240 is L. The distance L corresponds to a particular runtime between desired transmitter 250 and receiver 240. Because the transmitter transmits a signal at one of the specified times of the time reference, and transmit zone 260 of desired transmitter 250 is known, receiver 240 can calculate the times at which it can expect a signal. If the receiver additionally knows the transmit time, it can calculate the distance from which the transmitter has transmitted the signal to the receiver.

The position of transmit zone 260 is a function of the position of receiver 240 and the runtime of the signal. At the above-named times, receiver 240 waits for a signal transmitted by a transmitter. If receiver 240 has recognized a signal that it can correctly demodulate, then it receives and demodulates the signal.

No messages are received from the undesired transmitters 270 situated outside transmit zone 260, because the corresponding runtimes generally do not correspond to the expected runtime.

What is claimed is:

1. A method for a locationally selective reception of a signal by radio, both a transmitter and a receiver being synchronized to the same time reference, and the transmitter transmitting the signal at a time that is one of the specified times of the time reference, the method comprising the following steps:
   determining, by the receiver, a transmit location within a transmit zone from which the receiver is to selectively receive the signal, a position in the transmit zone being a function of a position of the receiver and a signal runtime, wherein the transmit zone is annular; and
   during a receive time period, receiving and demodulating, by the receiver, the signal transmitted by the transmitter,
   wherein a width of the transmit zone is a function of a signal structure of the signal.

2. The method as recited in claim 1, wherein the width of the transmit zone is a function of a length of a cyclic prefix of the signal structure.

3. The method as recited in claim 1, wherein the receiving take places on a level of a physical layer.

4. The method as recited in claim 1, wherein the receiver and transmitter are synchronized to the same time reference by the Global Positioning System.

5. The method as recited in claim 1, wherein the locationally selective reception is used in a geocasting system.

6. The method as recited in claim 1, wherein the receiver demodulates the radio signal as modulated using a CAZAC sequence.

7. The method as recited in claim 1, wherein receiving is independent of direction.

8. The method as recited in claim 1, wherein receiving is directionally dependent.

9. The method as recited in claim 8, wherein directionally dependent receiving is performed through beamforming.

10. The method as recited in claim 8, wherein directionally dependent receiving is performed through using directed antennas.

11. A receiver that is set up to receive a signal in locationally selective fashion, the receiver configured to:
    determine a transmit location within a transmit zone from which the receiver is to selectively receive the signal, a position in the transmit zone being a function of a position of the receiver and a signal runtime, wherein the transmit zone is annular; and
    during a receive time period, receive and demodulate a signal transmitted by the transmitter,
    wherein a width of the transmit zone is a function of a signal structure of the signal.

12. The receiver as recited in claim 11, wherein the width of the transmit zone is a function of a length of a cyclic prefix of the signal structure.

13. The receiver as recited in claim 11, wherein the receiving take places on a level of a physical layer.

14. The receiver as recited in claim 11, wherein the receiver and transmitter are synchronized to the same time reference by the Global Positioning System.

15. A non-transitory machine-readable storage medium on which is stored a computer program for a locationally selective reception of a signal by radio, the computer program, when executed by a computer, causing the computer to perform:
    determining a transmit location within a transmit zone from which the receiver is to selectively receive the signal, a position in the transmit zone being a function of a position of the receiver and a signal runtime, wherein the transmit zone is annular; and
    during a receive time period, receiving and demodulating a signal transmitted by the transmitter,
    wherein a width of the transmit zone is a function of a signal structure of the signal.

16. The non-transitory machine-readable storage medium as recited in claim 15, wherein the width of the transmit zone is a function of a length of a cyclic prefix of the signal structure.

17. The non-transitory machine-readable storage medium as recited in claim 15, wherein the receiving take places on a level of a physical layer.

18. The non-transitory machine-readable storage medium as recited in claim 15, wherein the receiver and transmitter are synchronized to the same time reference by the Global Positioning System.

* * * * *